INVENTOR.
EDWARD C. EHLKE
BY John W. Michael
ATTORNEY

Patented Feb. 20, 1951

2,542,802

UNITED STATES PATENT OFFICE 2,542,802

THERMOSTATIC EXPANSION VALVE WITH ADJUSTABLE PRESSURE LIMITING FEATURE

Edward C. Ehlke, Milwaukee, Wis., assignor to A P Controls Corporation, a corporation of Wisconsin Application September 22, 1948, Serial No. 50,546

6 Claims. (Cl. 236—92)

This invention relates to a thermostatic expansion valve having an adjustable pressure limiting feature.

The compression type refrigerating systems generally comprise a motor driven compressor delivering compressed refrigerant to a condenser where it is cooled and then delivered to a receiver from which it is expanded into an evaporator connected to the compressor suction line. The expansion into the evaporator is controlled by a thermostatic expansion valve regulated in accordance with the evaporator outlet temperature (preferably superheat) by means of a liquid-charged feeler bulb strapped to the outlet and actuating the valve through a diaphragm acted on by pressure variations in the bulb. Since the liquid-charged bulb always has liquid present, the pressure continues to rise with temperature, and the valve opening is also increased until the maximum stroke is obtained. In normal operation this feature is satisfactory, but when the evaporator temperature and pressure are high (after defrosting or during peak loads, for example) the valve is open permitting maximum flow. This results in an abnormal compressor suction pressure and requires more power during the pull-down to normal conditions. Therefore, a liquid charged thermostatic expansion valve requires a larger motor to pull down the system than would be required for normal operation.

In view of this objection, pressure limit charged thermostatic expansion valves have been used. Such a charge is entirely vaporized at a predetermined maximum temperature and, since the vapor pressure rise for increasing temperatures above the predetermined maximum is negligible, the increasing evaporator pressure opposing the valve actuating diaphragm acts to close the valve when the outlet temperature exceeds the maximum. The valve remains closed until the evaporator outlet temperature (and pressure) fall below the maximum thus preventing excessive suction pressure during pull-down and permitting a smaller motor to be used.

While the pressure limit charged thermostatic expansion valve is highly desirable from the user's standpoint, the manufacture of such valves is troublesome. In addition to being more difficult to charge the bulb, the valve, once charged, is limited to the particular knock-off pressure. Thus the manufacturer must stock many types of valves for different knock-off pressures.

It is an object of this invention, therefore, to provide a thermostatic expansion valve having an adjustable pressure limiting feature.

A further object of this invention is to provide an adjustable knock-off thermostatic expansion valve which may have an adjustable superheat control to render the valve adaptable to many installations.

Another object is to provide an adjustable knock-off thermostatic expansion valve which is simple to manufacture and adjust and is dependable in operation.

Other objects and advantages will be pointed out in, or be apparent from, the specification and claims, as will obvious modifications of the single embodiment shown in the drawings, in which:

Figure 1:
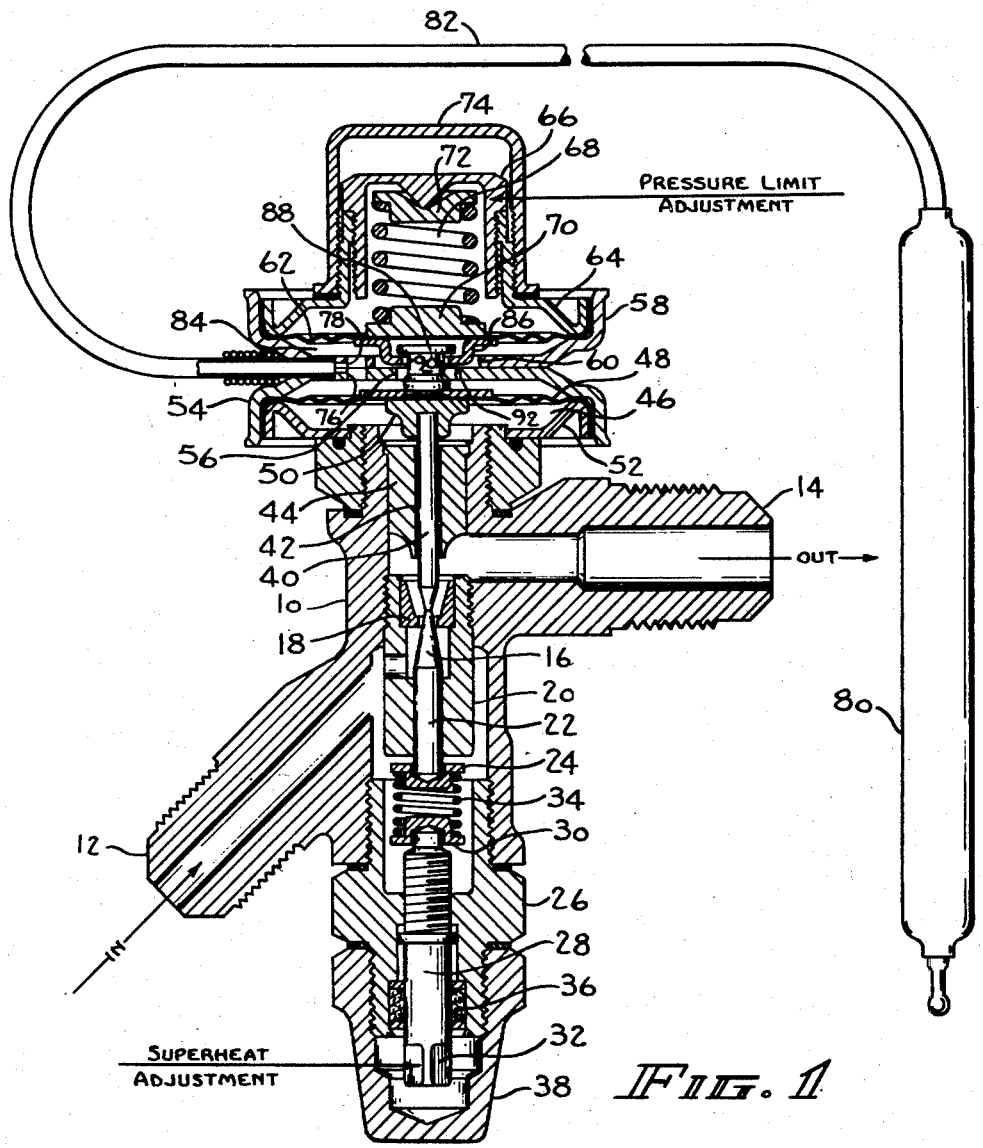
Fig. 1 is a cross section of a valve according to my invention.

Referring to the drawings in detail, the brass forged body 10 of the thermostatic expansion valve has an inlet 12 adapted to be threadably connected to the line from the receiver and has an outlet 14 adapted to be connected to the evaporator. Flow from the inlet to the outlet is regulated by valve 16 cooperating with seat 18 carried by stem guide 20 threaded in body 10. The lower end of valve stem 22 seats in spring seat 24. Gland member 26, threaded into the bottom of valve body 10, has adjusting stem 28 threaded therein with spring seat 30 on its upper end. When the squared end 32 of stem 28 is turned, the degree of compression of spring 34 between valve seats 24, 30 will be varied to vary the force with which valve 16 is urged toward seat 18. As will be pointed out hereinafter, this affords an adjustment for controlling the degree of superheat at the evaporator outlet. The lower end of gland 26 is provided with packing 36 to seal the valve and is covered by cap 38.

Thus valve 16 is urged toward seat 18 by compressed spring 34 with a force which may be adjusted by means of nut 32 on the end of stem 28. The valve is moved off its seat by means of a downward movement of pin 40 acting on the tip of valve 16 from the outlet or evaporator pressure side of the valve seat 18. The proper relationship of the point of pin 40 with respect to the point of valve 16 is maintained by bore 42 in guide 44 positioned in the upper end of valve body 10. Bore 42 additionally serves to allow pressure variations in the outlet side of valves 16 to be felt in chamber 46 and act on the underside of diaphragm 48 which carries the upper end of pin 40 in member 50 secured thereto. While bore 42 is shown as being appreciably larger than pin 40 for the purpose of illustrating such communication between the valve outlet and chamber 46, in actual manufacture the bore snugly cooperates with pin 40 without jeopardizing proper pressure communication.

The down-turned peripheral edge of cupped diaphragm 48 is secured in the lock joint between member 52 and a generally cup-shaped member 54 being provided with a central aperture 56. Another cupped member 58 somewhat similar to member 54 is hermetically sealed with and secured to member 54 and is provided with a central aperture 60 coaxial with and having a larger diameter than aperture 56 in member 54. The up-turned edges of cupped diaphragm 62 are locked between member 58 and threaded member 64 which receives adjusting nut 66. The adjusting nut may be turned to vary the compression of spring 68 between seat 70 carried by the upper side of diaphragm 62 and seat 72 bearing against adjusting nut 66. After nut 66 has been adjusted to give the proper knock-off pressure, it may be covered by means of cap 74 screwed on the exterior of member 64.

Cupped members 54, 58 are apertured at 76, 78, respectively, to provide free communication of pressure variations within feeler bulb 80 adapted to be strapped to the evaporator outlet and connected by capillary tube 82 to the chamber 84 between the two diaphragms 48, 62. Thus pressure increase in bulb 80 and consequently in chamber 84 due to a rise in evaporator outlet temperature will tend to move the diaphragms 48, 62 away from each other. Any such movement after the diaphragms have moved apart a predetermined distance is prevented by means of a one-way connection. The one-way connection comprises an apertured cupped member 86 having a peripheral annular flange secured to the underside of diaphragm 62 with the flanged head 88 of stud 90 carried by the upper surface of diaphragm 48 positioned in the space defined by it and the bottom of diaphragm 62. Since the diameter of head 88 is greater than the diameter of the aperture in cupped member 86, the diaphragms 48, 62 may move apart only until such time as the head abuts against member 86. It will be obvious, therefore, that since the pressure in chamber 84 tending to move the diaphragms 48, 62 apart exerts an equal force on each diaphragm, the force is cancelled out when this connection is made. When the bulb pressure acting in chamber 84 is cancelled out, it has the effect of making the two diaphragms a single diaphragm. Thus the evaporator or valve outlet pressure acting in chamber 46 is opposed only by atmospheric pressure and the force of spring 68 when the connection is made between the two diaphragms. At this time the adjusted force exerted by spring 68 acts to regulate valve 16. An increase in valve outlet pressure above the predetermined maximum will move the locked diaphragms upwardly against atmospheric pressure and spring 68 and allow spring 34 to close valve 16.

After defrosting, for example, the evaporator outlet temperature and pressure are high with the result that the bulb pressure acting in chamber 84 has moved the diaphragms to the locked position where the bulb pressure is balanced out and evaporator pressure in chamber 46 acts against atmospheric pressure and spring 68. Since the evaporator pressure is greater than the forces opposing it, the valve is closed and the compressor may pull down the system rapidly and without overload.

Figure 2:
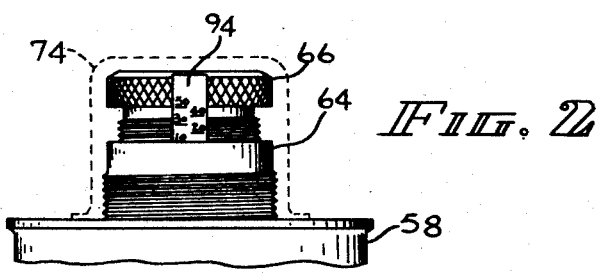
Fig. 2 shows the upper end of the valve in Fig. 1 with the cap removed to show one method of indicating the adjustment of the pressure limiting feature.

When the evaporator pressure drops below the value determined by setting the desired value indicated on cut-out 94 on adjusting nut 66 with reference to the top of member 64 (as shown in Fig. 2, where the setting is for ten pounds maximum evaporator pressure) the valve will open to admit refrigerant to the evaporator. If the pressure should again rise above the maximum, the valve will close. During this phase of operation the diaphragms are locked since the bulb pressure is slightly higher than the evaporator pressure.

After the evaporator pressure is reduced below the maximum value, the bulb controls the valve operation by flexing lower diaphragm 48. It will be remembered that the upper diaphragm seats at 92 during normal operation when the bulb pressure is less than the spring force and atmospheric pressure. Thus, as the evaporator outlet temperature is reduced to the value determined by the adjustment of spring 34, the valve opening is decreased.

It will be apparent that in the event the bulb pressure in chamber 84 acting against the upper diaphragm exceeds the opposing spring force and atmospheric pressure before the lower diaphragm has moved the valve to its maximum stroke, the upper diaphragm will move upwardly to lock the two diaphragms together. Under this condition the valve would be regulated by the evaporator pressure. Therefore, there is no condition where the evaporator pressure can exceed the predetermined value without closing the valve. Thus compressor overload is prevented under all operating conditions while maintaining adjustability of the superheat and knock-off.

Although but one embodiment of the present invention has been illustrated and described, it will be apparent to those skilled in the art that various changes and modifications may be made therein without departing from the spirit of the invention or from the scope of the appended claims.

I claim:

1. A thermostatic expansion valve for controlling refrigerant flow into an evaporator and for limiting the refrigerant pressure in the evaporator, having in combination, casing means having an inlet receiving refrigerant and an outlet connected to an evaporator, a valve in said casing means for controlling refrigerant flow therethrough, a first diaphragm operatively connected to said valve and being mounted in said casing means with one side exposed to refrigerant pressure in said outlet, a second diaphragm mounted in said casing means and spaced from the first diaphragm to form a chamber therebetween, feeler bulb means responsive to evaporator outlet temperature and being connected to said chamber to vary the pressure therein, means exerting a predetermined force on said second diaphragm, the pressure in the chamber acting on the second diaphragm in opposition to said exerting means and acting on said first diaphragm in opposition to said outlet pressure to control the valve opening in accordance with evaporator outlet pressure, and means responsive to the chamber pressure exceeding a given value to engage the diaphragms with respect to each other to move in unison, the outlet pressure being opposed by said predetermined force when the diaphragms are locked so the valve is closed when the outlet pressure exceeds the predetermined force.

2. A thermostatic expansion valve for controlling refrigerant flow into an evaporator and for limiting the refrigerant pressure in the evaporator, having in combination, casing means having an inlet receiving refrigerant and an outlet connected to an evaporator, a valve in said casing means for controlling refrigerant flow therethrough, a first diaphragm operatively connected to said valve and being mounted in said casing means with one side exposed to refrigerant pressure in said outlet, a second diaphragm mounted in said casing means and spaced from the first diaphragm to form a chamber therebetween, feeler bulb means responsive to evaporator outlet temperature and being connected to said chamber to vary the pressure therein, the pressure in the chamber acting on said first diaphragm in opposition to the outlet pressure to open the valve and acting on the chamber side of the second diaphragm, means exerting a predetermined force on the other side of the second diaphragm in opposition to said chamber pressure, means responsive to a given chamber pressure to lock the diaphragms with respect to each other so the chamber pressure acting therebetween is substantially balanced out, said outlet pressure being opposed by the predetermined force of said exerting means when the chamber pressure is substantially balanced out.

3. A thermostatic expansion valve for controlling refrigerant flow into an evaporator and for limiting the refrigerant pressure in the evaporator, having in combination, casing means having an inlet receiving refrigerant and an outlet connected to an evaporator, a valve in said casing means for controlling refrigerant flow therethrough, a diaphragm operatively connected to said valve and being mounted in said casing means with one side exposed to refrigerant pressure in said outlet, the outlet pressure tending to flex the diaphragm to close the valve, said casing means including a chamber on the other side of said diaphragm, thermostatic means responsive to evaporator outlet temperature and being connected to said chamber to exert pressures on the other side of said diaphragm in opposition to said outlet pressure to control the valve opening, and means responsive to a predetermined pressure exerted by said thermostatic means to balance out the pressure on said other side of said diaphragm and for opposing the outlet pressure on said one side with a predetermined force so that an increase in the force exerted on the diaphragm by the outlet pressure above said predetermined force will close the valve.

4. In a pressure limiting thermostatic expansion valve for controlling refrigerant flow into an evaporator, in combination, casing means having an inlet to receive refrigerant and an outlet adapted for connection to an evaporator, a valve in said casing means for controlling refrigerant flow therethrough, a diaphragm operatively connected to said valve and being mounted in said casing means with one side exposed to refrigerant pressure in said outlet, said casing means including a chamber on the other side of said diaphragm, thermostatic means responsive to evaporator outlet temperature and connected to said chamber for exerting a pressure variation on the other side of said diaphragm to increase the valve opening with an increase in said temperature above a predetermined value, means responsive to a predetermined pressure in said thermostatic means for substantially balancing out the force on said other side of said diaphragm, and means responsive to the balancing out of said force to oppose the refrigerant pressure acting on said one side of said diaphragm with a predetermined force so the valve will close when the refrigerant pressure in the outlet exceeds said predetermined force.

5. A thermostatic expansion valve for controlling refrigerant flow into an evaporator and for limiting the refrigerant pressure in the evaporator, having in combination, casing means having an inlet receiving refrigerant and an outlet connected to an evaporator, a valve in said casing means for controlling refrigerant flow therethrough, a diaphragm operatively connected to said valve and being mounted in said casing means with one side exposed to refrigerant pressure in said outlet, the outlet pressure tending to flex the diaphragm to close the valve, said casing means including a chamber on the other side of said diaphragm, thermostatic means responsive to evaporator outlet temperature and being connected to said chamber to exert pressure on the other side of said diaphragm in opposition to said outlet pressure to control the valve opening, and means responsive to a predetermined maximum pressure in said thermostatic means to oppose the outlet pressure with a predetermined force so an increase in the force exerted by the outlet pressure above said predetermined force will act to move the diaphragm and close the valve.

6. A thermostatic expansion valve for controlling refrigerant flow into an evaporator and for limiting pressure in the evaporator, having, in combination, casing means having an inlet receiving refrigerant and an outlet connected to an evaporator, a valve in said casing means for controlling refrigerant flow therethrough, a valve spring biasing said valve toward the closed position, means for adjusting the force exerted by said valve spring, a first diaphragm operatively connected to said valve and being mounted in said casing with one side exposed to refrigerant pressure in said outlet, a second diaphragm mounted in said casing means and spaced from the first diaphragm to form a chamber therebetween, feeler bulb means responsive to evaporator outlet temperature and being connected to said chamber to vary the pressure therein, a diaphragm spring exerting force on said second diaphragm, means for adjusting the force exerted by said diaphragm spring, the pressure in the chamber acting on the second diaphragm in opposition to the force of said diaphragm spring and acting on said first diaphragm in opposition to said outlet pressure to control the valve opening in accordance with evaporator outlet pressure, and means responsive to the chamber pressure exceeding a given value to engage the diaphragms with respect to each other to move in unison, the outlet pressure being opposed by the force of said diaphragm spring when the diaphragms are locked so the valve is closed when the outlet pressure and the force of said valve spring exceed the force of said diaphragm spring.

EDWARD C. EHLKE.

REFERENCES CITED

The following references are of record in the file of this patent:

UNITED STATES PATENTS

| Number | Name | Date |
| --- | --- | --- |
| 2,113,351 | Lear | Apr. 5, 1938 |
| 2,192,117 | Wile | Feb. 27, 1940 |
| 2,259,280 | Wile | Oct. 14, 1941 |
| 2,399,088 | Andrews | Apr. 23, 1946 |